D. F. KILGOUR.
SHOCK ABSORBER.
APPLICATION FILED JUNE 2, 1911.
1,170,758.
Patented Feb. 8, 1916.
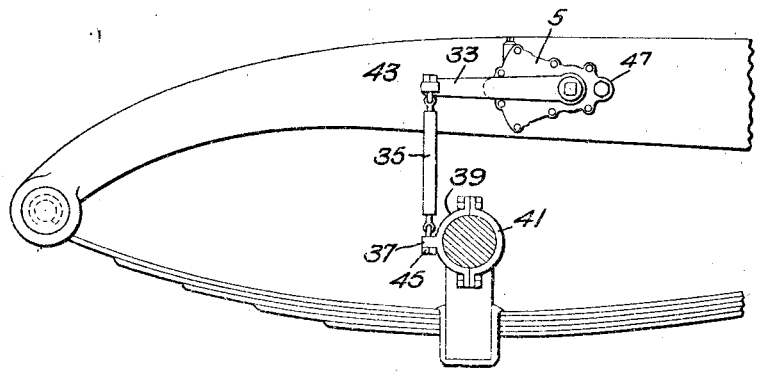
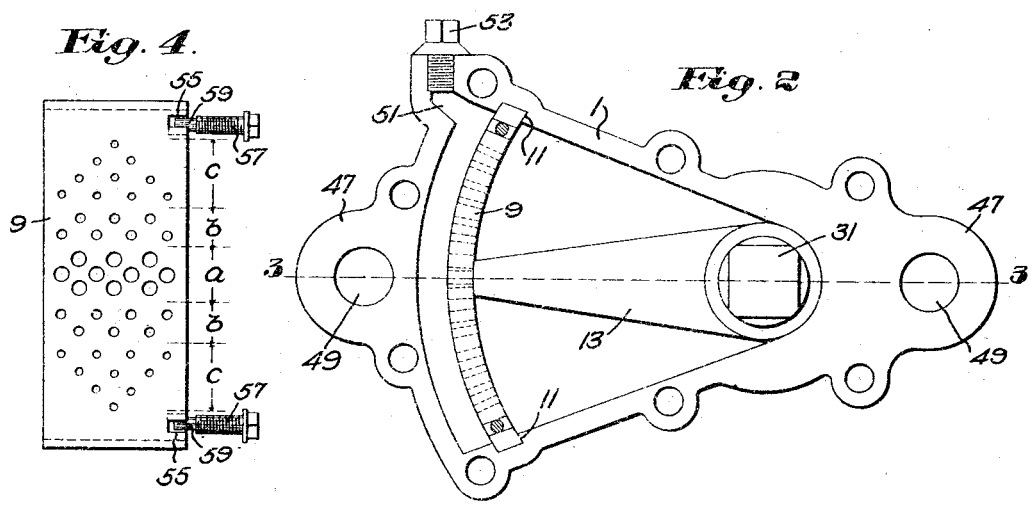
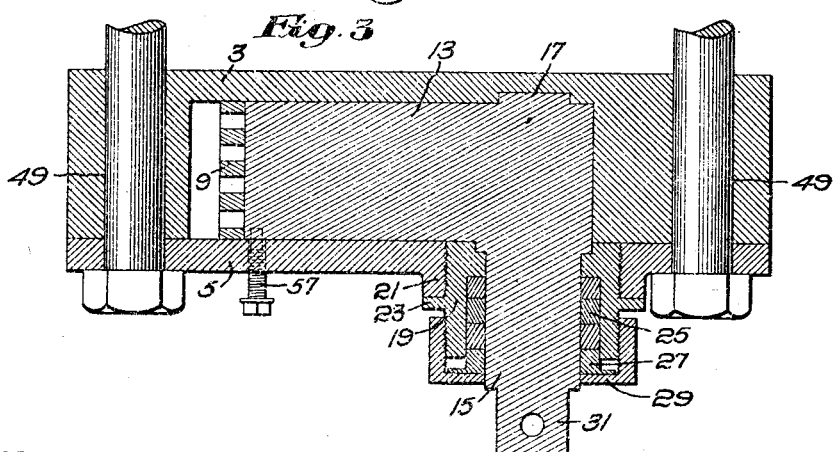
Witnesses:
Inventor:
Dwight F. Kilgour

UNITED STATES PATENT OFFICE.

DWIGHT F. KILGOUR, OF LEXINGTON, MASSACHUSETTS, ASSIGNOR TO KNOJAH SHOCK ABSORBER COMPANY, OF LEXINGTON, MASSACHUSETTS, A CORPORATION OF MASSACHUSETTS.

SHOCK-ABSORBER.

1,170,758.  Specification of Letters Patent.  Patented Feb. 8, 1916.

Application filed June 2, 1911. Serial No. 630,747.

*To all whom it may concern:*

Be it known that I, DWIGHT F. KILGOUR, a citizen of the United States, and a resident of Lexington, in the county of Middlesex and Commonwealth of Massachusetts, have invented an Improvement in Shock-Absorbers, of which the following description, in connection with the accompanying drawings, is a specification, like characters on the drawings representing like parts.

This invention relates to shock absorbers and is a modification of the invention disclosed in my United States Letters Patent No. 984,377 dated February 14, 1911.

The character of the invention may be best understood by reference to the following description of an illustrative embodiment thereof shown in the accompanying drawing, wherein:

Figure 1 is a view of a portion of a vehicle equipped with a shock absorber embodying the invention; Fig. 2 on an enlarged scale is a vertical section through the shock absorber shown in Fig. 1 isolated from the vehicle; Fig. 3 is a transverse section taken on line 3—3 of Fig. 2; and Fig. 4 is a detail of an element of the shock absorber to be referred to.

Referring to the drawing, the illustrative embodiment of the invention there shown comprises a casing 1, herein of sector form and provided with cover plates 3 and 5 which may be conveniently secured to said casing by bolts entering through registering apertures in said plates and casing. To divide the casing thus formed into two chambers, there is provided an arc like partition plate or wall 9 adapted to be slid into grooves 11 in the sides of said casing, said partition plate being retained in place by the cover plates on the opposite sides of the casing. The partition may be readily removed for replacement merely by removing one of said cover plates. Within the larger chamber is a plunger, herein in the form of oscillatory blade 13 projecting radially from a shaft 15 conveniently integral with said blade and having a stud 17 seated in a similarly shaped recess in one of said cover plates. The shaft extends beyond the opposite side of said blade through a stuffing box 19 threaded into a short boss 21 in the cover plate 5. Inward adjustment of said stuffing box is limited by a flange 23 thereon engaging the end of said boss. The stuffing box is provided with suitable packing material 25 and a gland 27 held in place by a cap 29 threaded exteriorly on said stuffing box. The portion of the casing receiving said shaft preferably is curved to conform to the contour of said shaft. The latter projects beyond said stuffing box and is reduced and squared off at 31 to receive an actuating arm 33 pinned or otherwise secured thereto. The free end of said arm has a universal connection with one end of a link 35, the opposite end of which has a similar universal connection with a lug 37 on a strap 39 adapted to be bolted to a similar strap 41, said straps being formed to embrace the axle of the vehicle. The universal connections referred to herein are in the form of pairs of interlinked staple-like members 43 which will readily permit up-and-down as well as lateral movements of the vehicle chassis or body. One of each pair of said interlinked staples is adjustably held in place by set nuts 45 thereby providing a convenient means for taking up wear and preventing rattling.

To permit the casing to be secured to the chassis of a vehicle or at other place of use, its ends are extended to provide ears 47 having bolt receiving holes 49. As shown herein, the casing is secured to the chassis of the vehicle and the link 35 is connected to the axle of the vehicle, but it will be apparent that their positions might be reversed, if desired. The casing is of little thickness and may be readily secured in an inconspicuous position and in some instances within the channel of the chassis frame.

In the course of the travel of the vehicle, relative movements between the vehicle body and its axle will cause the casing to vibrate up and down with said body and effect relative movement between said casing and said rocking blade, the free end of the latter during this movement, wiping along the curved face of the partition plate referred to.

The chambers will contain and preferably be filled with a suitable retarding fluid or oil which may be introduced therein through an inlet duct 51 normally closed by a threaded plug 53. To permit the fluid or oil to pass or circulate from one of said chambers to another, said partition plate may be perforated analogously or similarly to the arrangement of perforations shown in my Letters Patent referred to. The perforations in said partition are arranged to permit the fluid to pass freely therethrough while the piston blade moves centrally of said plate, but offers greater resistance as the piston approaches the ends of said plate.

The partition contains a multiplicity of comparatively small openings presenting distributed fluid controlling friction surfaces resisting the egress of fluid through said partition at widely distributed points, and as a result furnishes a very advantageous and variable control over the piston in its movements.

To permit the perforations to provide a comparatively large total central area of opening intermediate the ends of said plate and an opening gradually reduced toward the ends of said plate, the multiplicity of comparatively small openings are distributed laterally of said plate and graded longitudinally of the latter toward the ends thereof. Herein the perforations are arranged in zones including a central zone $a$ containing comparatively large perforations, zones $b$, $b$ above and beneath said central zone providing a reduced total area of opening, and end perforated zones $c$, $c$ beyond the latter zones providing a still greater reduced total area of opening. By this arrangement, not only is the downward movement of the vehicle body cushioned, but also the rebound or recoil thereof is effectively cushioned.

The purpose of a shock absorber as applied to vehicles, is primarily to prevent any overstrain of the springs of the vehicle such as might occur on abnormal conditions of travel, and the effectiveness of a shock absorber is proportional to the degree in which it is successful in supplementing the springs and taking care of abnormal shocks, thereby permitting the springs to be freely responsive to absorb normal shocks.

The shock absorber described, lends itself very advantageously to this end. For example, when the vehicle is traveling over comparatively smooth roads, the plunger will oscillate comparatively freely with little resistance owing to the freedom of passage of the fluid through the central zone or zones, but on the occurrence of abnormal jolts, such as would throw the plunger beyond said central zones, the latter meets with greater resistance owing to the reduced area of opening presented by said end zone perforations. Preferably the plunger will be adjusted to lie normally somewhat beyond the central zone so that when the vehicle passes over obstructions, the plunger will be comparatively free to move past a substantial area offering little resistance or opposition to the plunger movement. On going over a severe obstruction, the plunger will move on and meet with greater resistance offered by the small or fewer openings, and on the recoil from the jolt the plunger will move back past the freer opening central zone into the other reduced area end zone. This will cushion and prevent the vehicle body from rebounding sufficiently to over-strain the springs and will maintain the vibrations of the vehicle continuously within the field of safe vibratory movement of said springs without passing beyond the elastic limit of the latter. In the event that the plunger should ever be moved sufficiently to contact with a side of the casing and render it difficult to start it away from such side owing to suction, there may be provided release passages 55 at the opposite extreme ends of said partition plate controlled by screw valves 57 threaded in said cover plates 5 and having smooth reduced ends 59 formed to fit in the said passages. These valves may be readily adjusted to throttle said openings more or less or completely as desired.

To adapt the shock absorber to different uses as, for example, vehicles of heavy and light draft, substitute partition plates may be employed having perforations of different areas or frequency.

It will be understood that the shock absorber is not limited in its use to vehicles, but that it may be readily employed for other purposes.

Having described one embodiment of the invention without limiting the same thereto, what I claim as new and desire to secure by Letters Patent is:

1. A shock absorber comprising, in combination, a sector-shaped fluid containing casing; and an arc-like partition therein having a multiplicity of comparatively small openings distributed laterally and graded longitudinally of said partition to present distributed fluid controlling friction surfaces; and a plunger fulcrumed in said casing and movable against the resistance offered to the passage of said fluid by said openings.

2. A shock absorber comprising in combination, a sector shaped fluid-containing casing having a curved wall; a curved partition spaced from said wall and dividing said casing into chambers, said partition having a multiplicity of graded and distributed fluid-controlling holes therethrough; and an oscillatory blade in one of said chambers for forcing the fluid from the fulcrum end of said blade along the latter through the holes in said partition to the opposite side of said blade.

3. A shock absorber comprising in combination, a sector shaped fluid-containing casing; a partition removably mounted in said casing and having a multiplicity of graded and distributed fluid-controlling holes extending therethrough, and an oscillatory plunger fulcrumed in said casing for forcing the fluid through the holes in said partition.

4. A shock absorber comprising in combination, a sector shaped fluid-containing casing 1; a partition 9 therein having a multiplicity of graded and distributed fluid-controlling holes extending therethrough; a cover plate 5; means to secure said plate to said casing; an oscillatory plunger 13 in said casing; and a shaft 15 for said plunger projecting out of said casing.

In testimony whereof, I have signed my name to this specification, in the presence of two subscribing witnesses.

DWIGHT F. KILGOUR.

Witnesses:
HENRY T. WILLIAMS,
ROBERT H. KAMMLER.